United States Patent
Nazari et al.

(10) Patent No.: US 11,126,451 B2
(45) Date of Patent: Sep. 21, 2021

(54) CONVERTING VIRTUAL VOLUMES IN PLACE

(71) Applicant: HEWLETT PACKARD ENTERPRISE DEVELOPMENT LP, Houston, TX (US)

(72) Inventors: Siamak Nazari, Mountain View, CA (US); Srinivasa D. Murthy, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 172 days.

(21) Appl. No.: 15/792,632

(22) Filed: Oct. 24, 2017

(65) Prior Publication Data

US 2019/0188017 A1      Jun. 20, 2019

(51) Int. Cl.
| | |
|---|---|
| *G06F 9/455* | (2018.01) |
| *G06F 9/54* | (2006.01) |
| *G06F 12/1009* | (2016.01) |
| *G06F 3/06* | (2006.01) |

(52) U.S. Cl.
CPC ........ *G06F 9/45558* (2013.01); *G06F 3/0601* (2013.01); *G06F 9/545* (2013.01); *G06F 12/1009* (2013.01); *G06F 2009/45579* (2013.01); *G06F 2009/45583* (2013.01)

(58) Field of Classification Search
CPC .. G06F 9/45558; G06F 12/1009; G06F 9/545; G06F 2009/45583; G06F 2009/45579
USPC ................ 711/209, 170, E12.002, 203, 206, 711/E12.001, E12.008, E12.084
See application file for complete search history.

(56) References Cited

U.S. PATENT DOCUMENTS

| | | | |
|---|---|---|---|
| 5,920,895 A * | 7/1999 | Perazzoli, Jr. ...... | G06F 12/0866 711/118 |
| 7,191,304 B1 | 3/2007 | Cameron et al. | |
| 7,308,545 B1 | 12/2007 | Kekre et al. | |
| 8,073,816 B1 * | 12/2011 | Luke ..................... | G06F 3/0605 707/644 |
| 8,239,402 B1 * | 8/2012 | Kumaresan .......... | G06F 16/116 707/769 |
| 8,732,343 B1 | 5/2014 | Awasthi et al. | |
| 8,856,080 B2 | 10/2014 | Khanzode et al. | |
| 9,075,755 B1 | 7/2015 | Haase et al. | |
| 9,229,637 B2 * | 1/2016 | Kashiyama ............ | G06F 3/067 |
| 9,485,308 B2 | 11/2016 | Eisler et al. | |
| 9,760,313 B1 | 9/2017 | Colgrove et al. | |
| 9,983,795 B1 * | 5/2018 | Naamad ................ | G06F 3/0629 |
| 10,747,718 B2 | 8/2020 | Bhattacharyya et al. | |

(Continued)

OTHER PUBLICATIONS

Nemnom, C., "How to Reduce DPM 2016 Storage Consumption by Enabling Deduplication on Modern Backup Storage?" (Research Paper), Oct. 25, 2016, 24 pages, https://charbelnemnom.com/2016/10/how-to-reduce-dpm-2016-storage-consumption-by-enabling-deduplication-on-modern-backup-storage/.

(Continued)

*Primary Examiner* — Sanjiv Shah
*Assistant Examiner* — Edward Waddy, Jr.
(74) *Attorney, Agent, or Firm* — Trop, Primer & Hu, P.C.

(57) ABSTRACT

A technique includes changing a configuration setting of a virtual volume of data stored in a storage system. The technique includes converting data of the virtual volume in place to reflect the changing of the configuration setting.

22 Claims, 8 Drawing Sheets

(56) References Cited

U.S. PATENT DOCUMENTS

| | | | | |
|---|---|---|---|---|
| 2002/0152415 A1* | 10/2002 | Franklin | ............... | G06F 3/061 |
| | | | | 714/6.22 |
| 2008/0294844 A1 | 11/2008 | Yamasaki | | |
| 2010/0235597 A1* | 9/2010 | Arakawa | ............... | G06F 3/0605 |
| | | | | 711/163 |
| 2015/0019834 A1* | 1/2015 | Loh | ..................... | G06F 12/023 |
| | | | | 711/208 |
| 2015/0235047 A1 | 8/2015 | Lenzmeier et al. | | |

OTHER PUBLICATIONS

Douglas Gilbert, "XCOPY and ODX in ddpt utility," Dec. 27, 2014, <http://sg.danny.cz/sg/ddpt_xcopy_dtx.html>.
Knight et al., "SBC-3/SPC-4—Third Party Copy Commands for SBC-3," Jan 11, 2012, T10/11-489 r2.
Microsoft, "Offloaded data transfers," Jan 11, 2017, <https://msdn.microsoft.com/en-us/windows/compatibility/offloaded-data-transfers>.
Microsoft, "Windows Offloaded Data Transfers Overview," Aug. 13, 2014, <https://technet.microsoft.com/en-us/library/hh831628(v=ws.11).aspx>.
T10 Technical Committee on SCSI Storage Interfaces, "Working Draft SCSI Extended Copy Command," Apr. 2, 1999, T10/99-143r1, <http://www.t10.org/ftp/t10/docurnent.99/99-143r1.pdf>.
Hewlett Packard Enterprise Development LP, "HPE 3PAR Virtual Copy: Snapshots and copy data management",Technical White Paper, Doc. No. 4AA6-4486ENW, Rev. 1, Apr. 2016, 31 pages.

* cited by examiner

CONVERTING VIRTUAL VOLUMES IN PLACE

BACKGROUND

A data storage input/output (I/O) system may provide a virtualized storage container, which represents data stored in one or multiple physical mass storage devices of the system. The storage container, in turn, may allow the definition of units of virtual storage called, "virtual volumes." As an example, a given virtual volume may be associated with a particular virtual machine, and as such, the virtual volume may be used to store data pertaining to virtual disks and other virtual files pertaining to the associated virtual machine. Because such attributes as quality of service objectives and service level objectives vary from one virtual machine to the next, the virtual volume allows the customization of features that accommodate specific attributes of the virtual machine. A given virtual volume may have a set of features that are controlled by corresponding configuration settings, such as features pertaining to, for example, whether the virtual volume stores compressed data, whether the virtual volume stores deduplicated data, and so forth.

DETAILED DESCRIPTION

Figure 1:
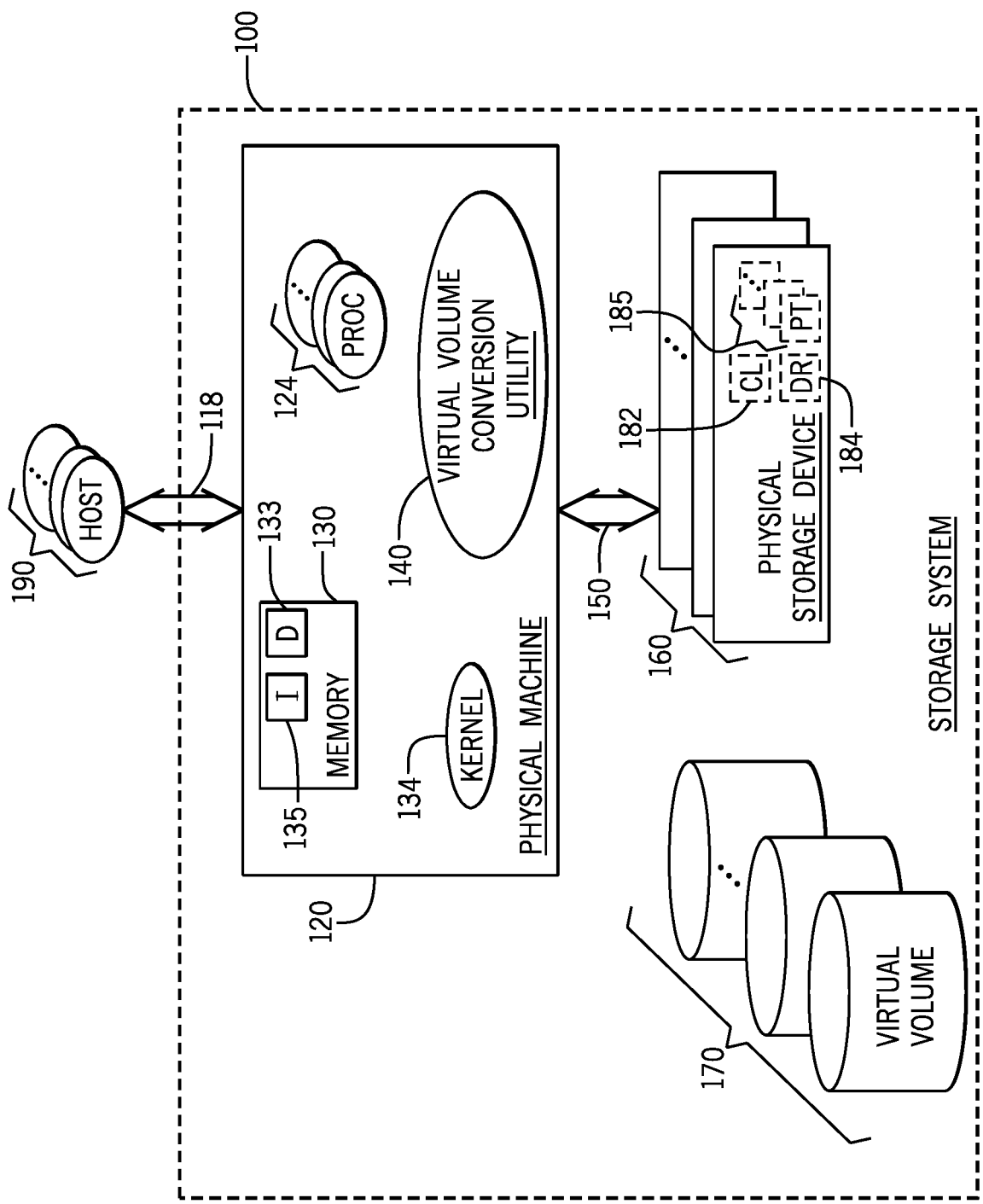
FIG. 1 is a schematic diagram of a storage system according to an example implementation.

A customer of a storage system may, from time to time, enable or disable one or multiple configuration settings of a virtual volume for purposes of changing features of the volume after the virtual volume has been created and has accumulated data. For example, a customer may change a configuration setting for a particular virtual volume so that instead of storing uncompressed data, the virtual volume now stores compressed data. As another example, the user may change a configuration setting so that a virtual volume changes from storing deduplicated data to storing data that is not deduplicated. Because a given feature change may be a fundamental change in how the data of the virtual volume is stored, the feature change may be viewed as effectively converting the data. Accordingly, the storage system, in response to such a fundamental change, may perform data conversion of the virtual volume while the virtual volume is providing data services, i.e., while the virtual volume is being read and written.

One way to convert the data of a virtual volume is to use data movement features within the array of physical storage devices, which stores the virtual volume data. In this manner, the storage system may create a new virtual volume (i.e., a virtual volume having the feature or features indicated by the configuration setting change(s)) and copy data from the old, source virtual volume (i.e., the virtual volume being converted) to the new, target virtual volume. In other words, the storage system may create the new virtual volume in newly-allocated physical storage space so that while the conversion is being performed, the corresponding physical storage size doubles. It is noted that the customer of the storage system may or may not be aware (depending on the particular implementation) of the creation of the new volume. For example, the storage system may present a single volume view to the customer while the old volume is being converted. Nevertheless, this approach allocates double the physical storage space until the conversion is complete.

Additionally, the above-described approach of creating a new volume for the conversion may cause certain features of the old volume, such as features pertaining to snapshots and replication, to not be inherited; and as such, these features may not be part of the new, target virtual volume. Accordingly, the customer may not have disaster recovery protection during the virtual volume conversion.

In accordance with example implementations that are described herein, a virtual volume is converted in place, or in situ. In this context, "in place," or "in situ," conversion refers to converting data associated with the virtual volume without allocating another virtual volume or, in general, allocating physical storage space for the storage of duplicate information so that a new virtual volume is created during the conversion. Instead, the existing virtual volume (i.e., the virtual volume being converted) is updated to reflect the new feature set represented by the configuration setting change(s). As described herein, the in situ virtual volume conversion may be accomplished by first changing one or multiple configuration settings in a data repository of the storage system (i.e., change metadata) to reflect that the virtual volume has been converted (although the conversion is actually yet to occur). Subsequently, as described herein, user mode and operating system (OS) kernel mode operations may be performed to convert the data of the volume to embody the requested changed configuration setting (e.g., convert the data from uncompressed data to compressed data, etc.).

As an example, a configuration setting of a given virtual volume may represent that the virtual volume stores uncompressed data. The configuration setting may be changed to turn on compression for the virtual volume, and as a result the data associated with the virtual volume should be compressed. Although one way to do this, as described above, is to read uncompressed data from an old, source virtual volume, compress the data and write the compressed data to a new, target volume, in accordance with example implementations, the conversion is performed in situ. More specifically, in accordance with example implementations, a user mode utility provides dataless write requests to the virtual volume that is being converted. The OS kernel processes these dataless write requests, which cause the OS kernel to read data embodying the old configuration setting(s) and write back data embodying the new configuration setting(s).

More specifically, in accordance with example implementations, for purposes of converting the data of a virtual volume to reflect a configuration change, a user mode virtual volume conversion utility issues, or provides, dataless write requests that are processed by the OS kernel. In this context, a "dataless write request" refers to a request for the OS kernel to write to a certain location (a page of the virtual volume, for example). However, the request does not contain data to be written to the location. In the processing of a dataless write request, the OS kernel reads data from the virtual volume and writes data back to the virtual volume. For example, if a dataless write request targets a particular page of the virtual volume, the OS kernel reads data representing the page and writes data back to the page.

In accordance with example implementations, in processing a given dataless write request, the data read by the OS kernel may be different than the data that the OS kernel writes back. In this manner, in accordance with example implementations, the OS kernel determines from metadata of the read page whether the page data embodies the appropriate configuration setting(s) of the virtual volume. For example, a particular configuration setting of the virtual volume may represent whether or not the data of the virtual volume is to be compressed. This setting may have been, at one time, set to turn off compression, but the setting may have been recently changed to turn on compression. The OS kernel may determine from the metadata of a page read from the volume whether or not the data for the page is compressed. Accordingly, the OS kernel may determine whether the read data is consistent with the "compression on" setting for the virtual volume.

In accordance with example implementations, the OS kernel, when processing a dataless write request, determines whether the page data that is read is consistent with the configuration of the virtual volume, converts the page data if it is not (to embody the configuration of the virtual volume) and then writes the data (i.e., the converted data or the originally data) back to the virtual volume. In this manner, for the example that is set forth above, if the OS kernel determines, in the processing of the dataless write operation, that the read data is not compressed (but should be per the configuration setting for the virtual volume), the OS kernel compresses the data so that the compressed data embodies the configuration setting for the virtual volume; and the OS kernel then writes the compressed data back to the virtual volume.

The processing of a given dataless write request, however, may not involve converting the read data. In this manner, continuing the example above, the OS kernel may process another dataless write request and determine that the read page data is compressed, and as such, the OS kernel writes back the read data to the page, without modifying the data.

In accordance with example implementations, the storage system converts the virtual volume while the storage system is processing input/output (I/O) requests (requests provided by hosts of the storage system, for example) that are directed to the virtual volume. In accordance with example implementations, the OS kernel may process such I/O requests in a manner that makes the virtual volume conversion transparent to the hosts. In this manner, the OS kernel may implements locks, as described herein, to prevent access to a page that is in the process of being converted due to the processing of a dataless write request by the OS kernel. Moreover, in accordance with example implementations, the OS kernel may process I/O requests directed to pages of the virtual volume, which have not been converted in a way that is consistent with the current configuration settings of the virtual volume. For example, the OS kernel may process an I/O request (provided by a host) by reading data from the requested page and determining (based on the metadata of the page) whether the read data embodies the configuration settings for the virtual volume. If so, the OS kernel provides the read data to the requesting host. Otherwise, if the read data does not embody the configuration settings for the virtual volume (the data is compressed and should be uncompressed, or vice versa, as examples) then, in accordance with example implementations, the OS kernel converts the data, writes the converted data back to the virtual volume and provides the converted data to the host.

It is noted that similar transformations of data may be applied to snapshots (either read only or read/write snapshots). Moreover, the data storage system provides consistency to the data conversion and, as further described herein, efficiently accommodates thin provisioned virtual volumes.

As a more specific example, FIG. 1 depicts a storage system 100 in accordance with example implementations. In accordance with example implementations, the storage system 100 may be a block-based storage input/output (I/O) system, at which, at its lowest physical level, stores data blocks on physical storage devices 160 (magnetic mass storage devices, non-volatile memory-based mass storage devices, and so forth). The storage system 100, in accordance with example implementations, may provide a virtualized representation of the data stored on the physical storage devices in the form of one or multiple virtual volumes 170.

In general, the physical storage devices 160 may store data other than data pertaining to the data stored in the virtual volumes 170, such as, for example, a data repository 184, which may include, for example, data identifying configuration settings for the virtual volumes 170; and data 185 representing page tables for the virtual volumes 170. Moreover, in accordance with example implementations, the physical storage devices 160 may store data that is related to establishing the durability of the data stored in the storage system 100, such as, for example, one or multiple commit logs 182, which represent writes committed to storage so that if a power loss or failure of the storage system 100 should occur, the commit log(s) 182 may be used to roll back the storage system 100 to a consistent state.

In accordance with example implementations, the storage system 100 includes one or multiple physical machines 120, which may represent one or multiple computers or servers of the storage system 100. In general, the physical machine 120 is an actual machine that is made up of actual hardware and machine executable instructions (or "software"). As described herein, in general, the physical machine 120 handles I/O requests (read requests, write requests, and so forth) which are submitted to the storage system 100 by one or multiple hosts 190. In this manner, in accordance with example implementations, an operating system (OS) kernel 134 of the physical machine 120 may process I/O requests that are submitted by the hosts 190 to the storage system 100 in a manner that maintains consistency for the data that is stored by the storage system 100.

For example, in accordance with some implementations, the OS kernel 134 may, in response to a read request from a given host 190 to a given page of one of the virtual volumes 170, place a lock on the page and then release the lock when the host 190 writes back to the page, for purposes of maintaining consistency of the page. In this manner, locks on pages are used to provide consistency so that readers lock out writers and vice versa while their operations are in progress.

As depicted in FIG. 1, in accordance with some implementations, the hardware of the physical machine 120 may include one or multiple processors 124. In this manner, a given processor 124 may include one or multiple central processing units (CPUs), one or multiple CPU processing cores, and so forth. The processor(s) 124 may execute instructions 135 that are stored in a memory 130 of the physical machine 120 for purposes of forming software components of the physical machine 120, such as the OS kernel 134 and a user mode virtual volume conversion utility 140 that handles in situ conversion of the virtual volumes 170, as described herein. Moreover, the memory 130 may store data 133 pertaining to user mode and OS data for the various techniques that are described herein. In accordance with example implementations, the data 133 may include data that, at a given time, represents virtual volume page tables read from the data repository 184, virtual volume configuration settings read from the data repository 184, data to be written to the consistency log(s) 182, and so forth.

In accordance with example implementations, the memory 130 is a non-transitory storage medium and may be formed from, as examples, semiconductor storage devices, phase change memory devices, memristors, volatile memory devices, non-volatile memory devices, storage devices associated with other storage technologies, a combination of storage devices selected from one or more of the foregoing storage technologies, and so forth.

In accordance with further example implementations, the physical machine 120 may include one or multiple hardware circuits that do not execute machine executable instructions for purposes of forming the components of the machine 120, such as, for example, the conversion utility 140. In this regard, in accordance with further example implementations, in place of a processor executing instructions, for example, the physical machine 120 may include a hardware circuit, such as a field programmable gate array (FPGA), an application specific integrated circuit (ASIC), and so forth.

Although the physical machine 120 is depicted in FIG. 1 as being contained in a "box," or "rack," in accordance with further example implementations, the physical machine 120 may be formed from multiple machines or machines disposed on multiple racks. Moreover, in accordance with example implementations, the physical machine 120 may include components that are geographically distributed at multiple locations. Thus, many implementations are contemplated, which are within the scope of the appended claims.

In accordance with some implementations, the storage system 100 may communicate with the hosts 190 via network fabric 118. In general, the network fabric 118 may include any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Moreover, in accordance with example implementations, the network fabric 118 may include any number of network devices for purposes of facilitating communications between the hosts 190 and the storage system 100. Moreover, a given host 190 may be any electronic device that may interact with the storage system 100, such as, as examples, a desktop computer, a portable computer, a smartphone, a wearable device, a client, a server, a thin client, a tablet computer, and so forth.

In accordance with example implementations, the physical machine 120 may communicate data to and from the physical storage devices 160 via communication fabric 150, such as, for example, fabric that includes a small computer system interface (SCSI), a Transmission Control Protocol/Internet Protocol (TCP/IP) network-based fabric, an internet SCSI (iSCSI)-based fabric, Fibre Channel-based network fabric, as well as other communication fabrics associated with a combination of these or other communication protocols, depending on the particular implementation.

In accordance with example implementations, the storage system 100 may receive a request from a host 190 to change one or multiple configuration settings for a given virtual volume 170. In response to the change, the physical machine 120 may perform in situ, or in place, conversion of the virtual volume 170 so that when the conversion is complete, the data of the virtual volume embodies the changed configuration setting(s). Moreover, as described herein, the storage system 100 may undertake measures to make the ongoing conversion be transparent to the hosts 190 so that should a host 190 access the virtual volume during the conversion process, the data provided by the storage system 100 to the host 190 is consistent with the changed configuration setting(s).

In accordance with example implementations, the virtual volume conversion utility 140, a user mode utility, handles aspects of the conversion, such as, for example, first modifying the appropriate data in the data repository 184 to reflect the change(s) that have been made to the configuration setting(s). Moreover, in accordance with example implementations, the conversion utility 140 sets up threads for purposes of issuing dataless write requests to the OS kernel 134 to perform the volume conversion. In this context, a "thread" refers to a unit of machine executable instructions, which may be executed in a parallel fashion with other similar units.

Figure 2:
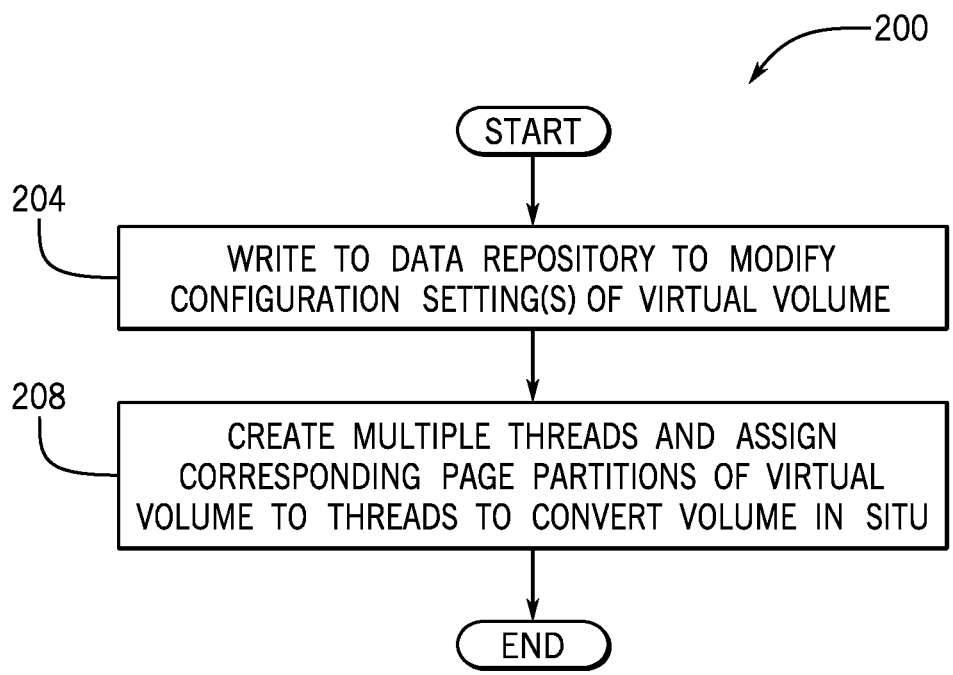
FIG. 2 is a flow diagram depicting a technique performed by a user mode application to set up in situ conversion of a virtual volume according to an example implementation.

Referring to FIG. 2 in conjunction with FIG. 1, in accordance with some implementations, the virtual version utility conversion module 140 may perform a technique 200 in response to receiving a request to change a configuration setting for data in a virtual volume 170, where making the configuration change would involve changing the data itself (e.g., compressing the data). The technique 200 includes writing (block 204) to the data repository 184 to modify one or multiple configuration settings of the virtual volume 170 so that, from the standpoint of the requesting host 190, the volume 170 appears to have been converted to reflect the requested change (although the data conversion has not yet taken place). In this manner, writing to the data repository 184 may involve updating metadata of the repository 184 so that the metadata represents the new configuration setting(s) for the virtual volume. Next, pursuant to block 208, the virtual volume utility 140 creates multiple threads and assigns corresponding page partitions of the virtual volume being converted to the threads. Each thread, in turn, provides dataless write requests for the pages of its assigned partition, and the OS kernel 134 processes, or handles, these dataless write requests to convert the pages of the virtual volume so that the data associated with these pages embody the new configuration setting(s) for the virtual volume.

Figure 3:
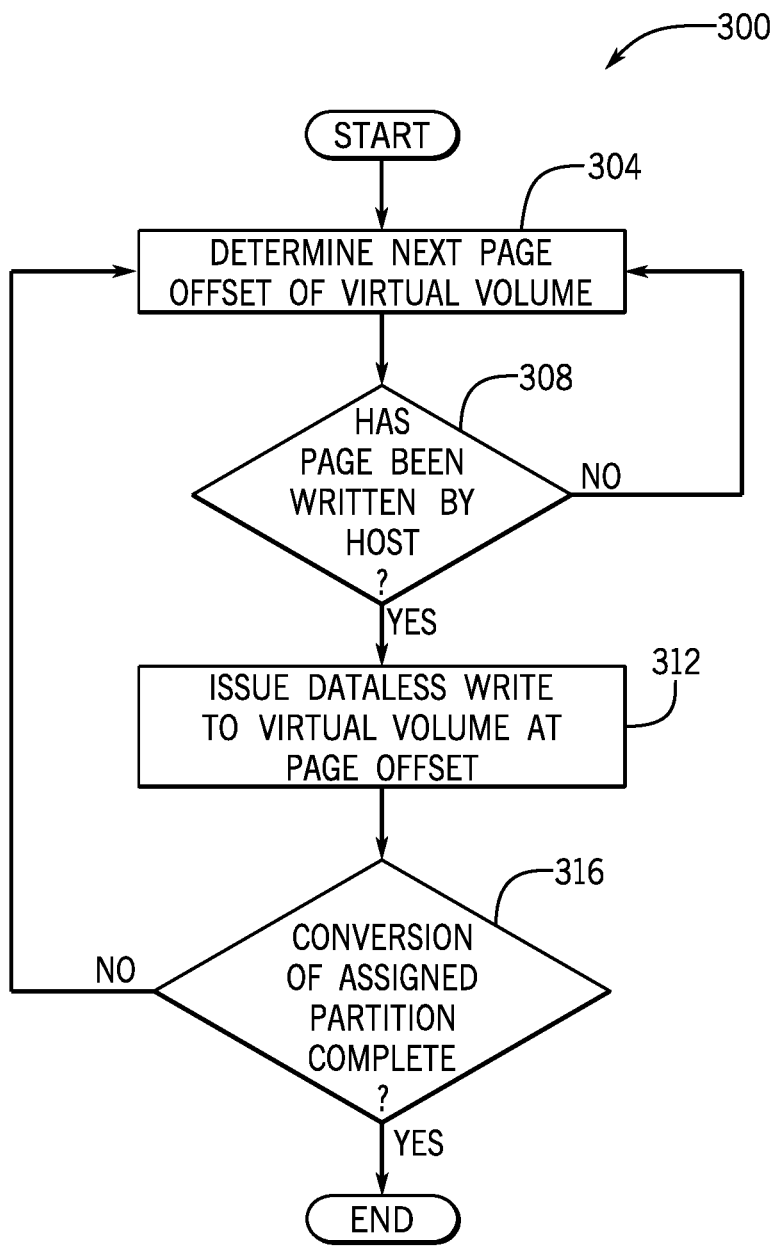
FIG. 3 is a flow diagram depicting a technique performed by a user mode thread to convert pages of a virtual volume in situ according to an example implementation.

Referring to FIG. 3 in conjunction with FIG. 1, each thread that is created by the conversion utility 140 may, in accordance with example implementations, perform a technique 300. Pursuant to the technique 300, the thread determines (block 304) the next page offset of the virtual volume. The thread may then determine (decision block 308) whether the page has been written (e.g., by a host), and if not, control returns to block 304 to determine the next page offset of the virtual volume. In this manner, in accordance with some implementations, the thread may perform an intelligent conversion that accommodates thin provisioned virtual volumes by skipping any unwritten offsets of such volumes. If a determination is made (decision block 308) that the page has been written (e.g., by a host), then, pursuant to block 312, the thread issues a dataless write to the OS kernel 134 at the page offset. Next, pursuant to decision block 316, a determination is made by the thread whether conversion of the partition that has been assigned to the thread is complete; and if not, control returns to block 304 to determine the next page offset of the virtual volume to be processed by the thread.

In accordance with example implementations, the thread may perform an intelligent conversion that accommodates thin provisioned virtual volumes by skipping any unwritten offsets of such volumes. In this manner, a thin provisioned volume is a volume that has a particular allocated size, but the actual storage footprint on the physical storage devices 160 corresponds to the current size of the data that is actually currently stored in the volume. For example, a user may create a virtual volume 170 as a thin provisioned volume that has a particular size, such as one terabyte (TB). However, the virtual volume may have an associated current data size of 100 gigabytes (GB). The remaining allocated part of the thin provision volume does not actually exist, but rather, if pages are read from the portion of the thin provision volume that has not yet been written, the data read may be a formatted value, such as zero bytes, for example. Therefore, in accordance with example implementations, the thread may determine whether the current page offset being processed by the thread has yet to be written (as in the case of a thin provisioned volume), and if so, the thread skips the unwritten offset.

Figure 4A:
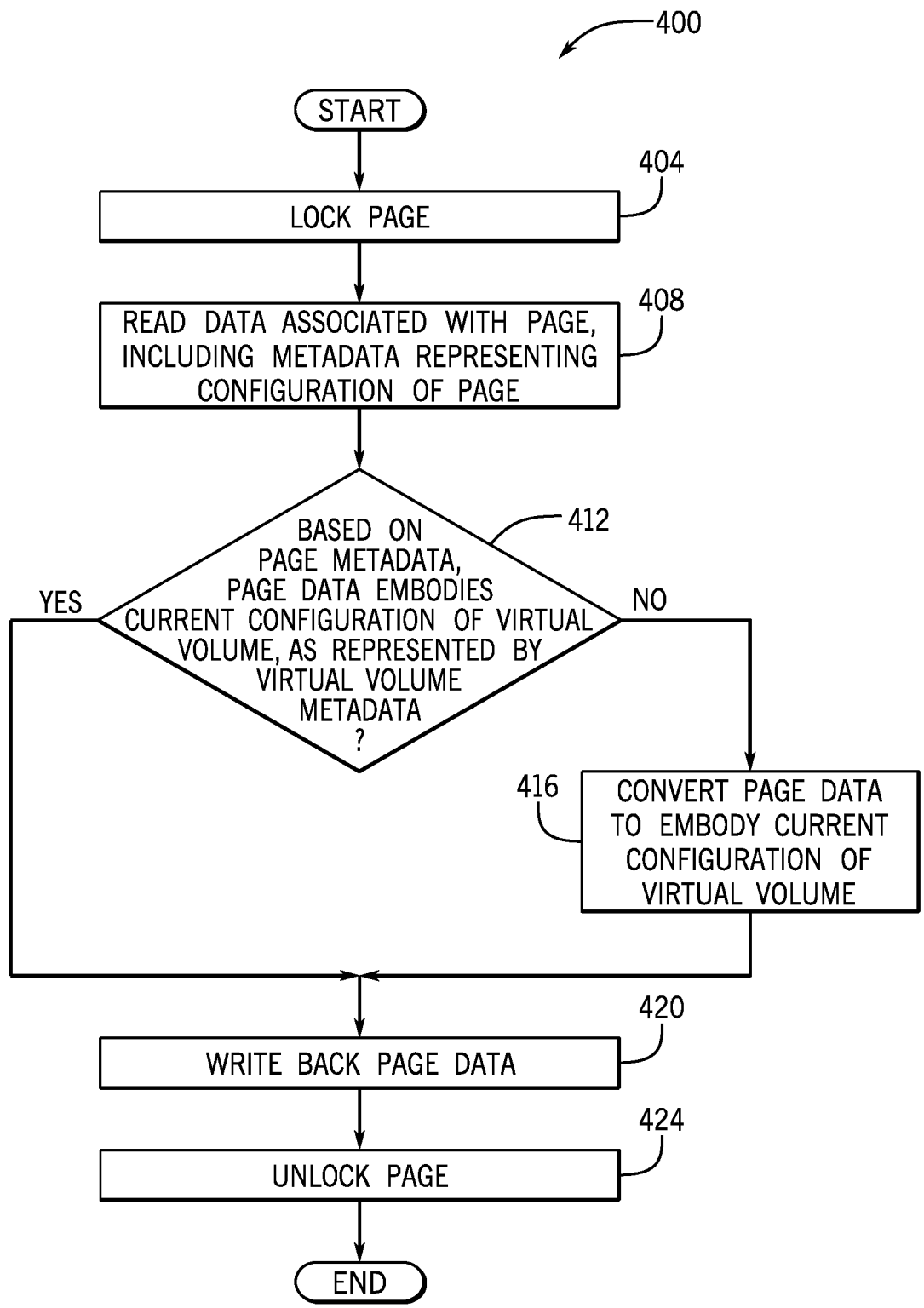
FIG. 4A is a flow diagram depicting processing of a dataless write request by an operating system (OS) kernel according to an example implementation.

Referring to FIG. 4A in conjunction with FIG. 1, in accordance with example implementations, the OS kernel 134 may process a dataless write pursuant to a technique 400. The OS kernel 134 may lock (block 404) the page targeted by the dataless write request and subsequently read (block 408) the data associated with the page. The read data includes metadata, which represents the configuration of the data of the page. For example, the metadata may represent, for example, whether or not the data of the page is compressed, whether or not the data of the page is deduplicated, and so forth. Based on the metadata, the OS kernel 134 may then determine whether the data of the page embodies the configuration settings of the virtual volume. For example, the metadata may represent that the data of the page is compressed, whereas the metadata for the virtual volume (stored in data repository 184) may represent that the virtual volume stores uncompressed data. If the OS kernel 134 determines (decision block 412) that the data of the page does not embody the configuration settings of the virtual volume, then the OS kernel 134 converts (block 416) the page data to embody these configuration settings. The OS kernel 134 then writes (block 420) back the page data (i.e., the original, read data or the converted data) and unlocks the page, pursuant to block 424.

Figure 4B:
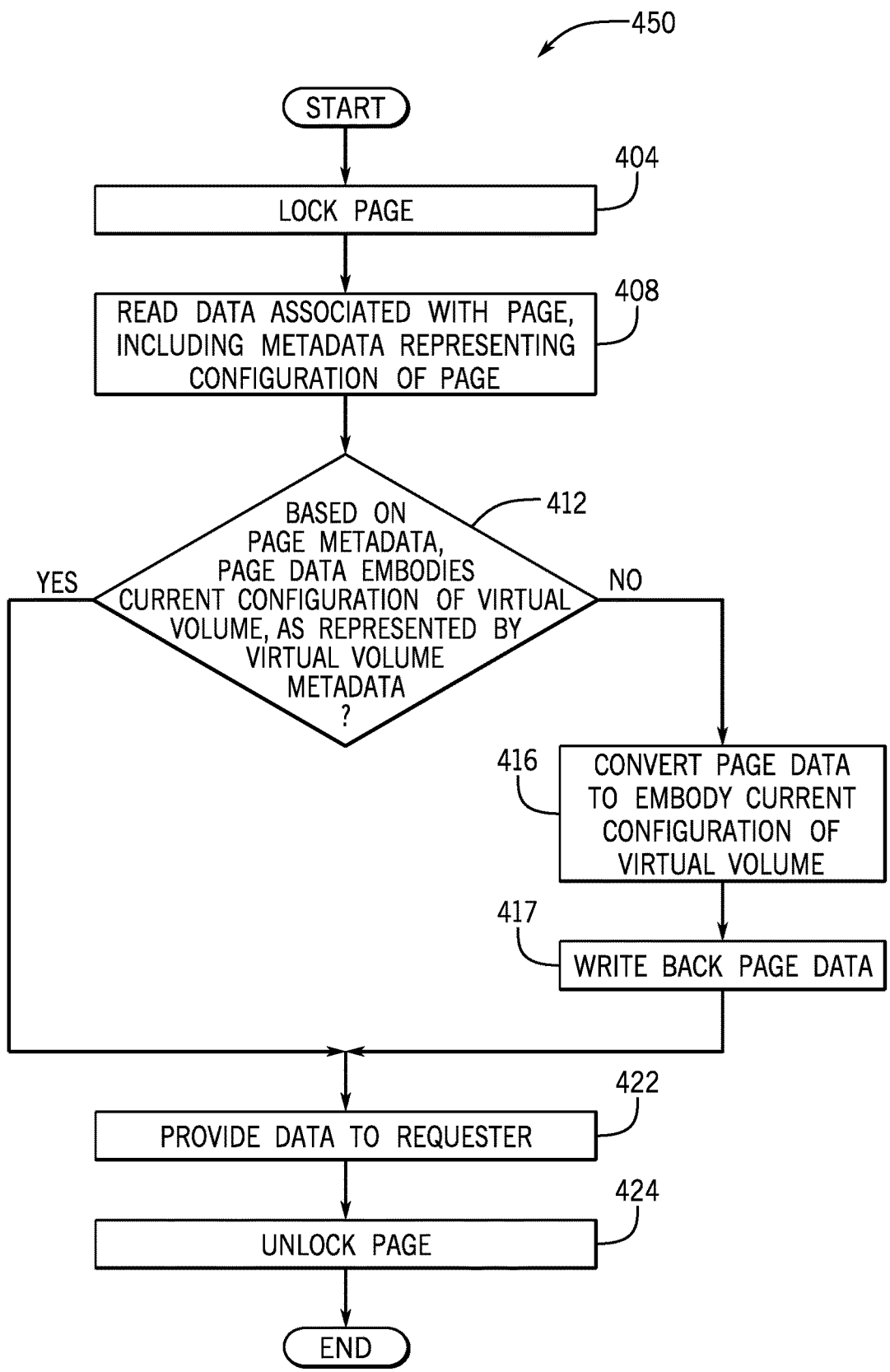
FIG. 4B is a flow diagram depicting processing of an input/output (I/O) request by the OS kernel according to an example implementation.

The OS kernel 134 may also, in accordance with example implementations, process I/O requests that are submitted by the hosts 190 in a manner that provides data consistent with the current configuration settings of the virtual volume and converts the data. In this manner, FIG. 4B depicts a technique 450 that the OS kernel 134 may use to process a I/O request, in accordance with example implementations. In general, the OS kernel 134 may initially process the I/O request similar to the dataless write request by locking (block 404) the page, reading (block 408) the page data, determining (decision block 412) whether the data should be converted. If the data should be converted, then the OS kernel 134 converts (block 416) to the data to embody the current configuration settings of the virtual volume and writes (block 417) the converted data back to the page. The OS kernel 134 provides (block 422) the data to the host requester (depending on the I/O request) and unlocks (block 424) the page.

It is noted that, in general, the OS kernel 134 converts a given page of a virtual volume by reading the data associated with the page and writing data back to the page embodying the new or changed configuration setting(s) of the virtual volume. In general, the conversion is performed in place, or in situ: the data read from the virtual volume is stored in a set of storage locations; and the writing of the data back to the virtual volume overwrites the data that is stored in at least some of these storage locations. In the conversion, less data may be read from the virtual volume than is written back to the virtual volume. For example, if the virtual volume is initially configured to store compressed data, and a configuration setting is changed so that the virtual volume now stores uncompressed data, then writing back uncompressed data to the virtual volume may involve overwriting data stored in the storage locations that stored the original compressed data, as well as writing data to newly allocated storage locations (as the uncompressed data has a larger storage footprint). Moreover, in the conversion, more data may be read from the virtual volume than is written back to the virtual volume. For example, if the virtual volume is initially configured to store uncompressed data, and a configuration setting is changed so that the virtual volume now stores compressed data, then writing back compressed data to the virtual volume may involve overwriting data in a subset of the storage locations that stored the original uncompressed data (as the compressed data has a smaller storage footprint).

Figure 5:
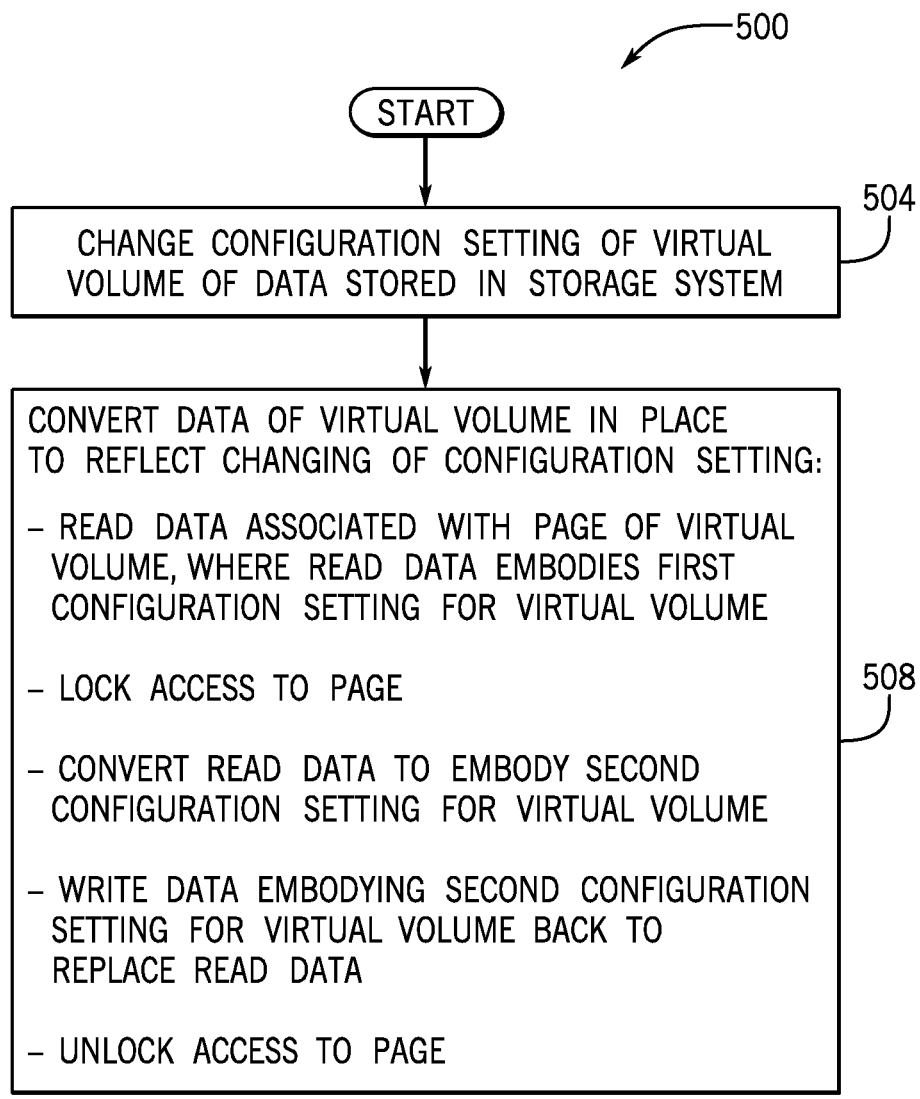
FIG. 5 is a flow diagram depicting a technique to convert a virtual volume in place according to an example implementation.

Thus, referring to FIG. 5, in accordance with example implementations, a technique 500 includes changing (block 504) a configuration setting of a virtual volume of data stored in a storage system. The technique 500 includes converting (block 508) data of the virtual volume in place to reflect the changing of the configuration setting. This conversion includes reading data associated with a page of the virtual volume (where the read data embodies a first configuration setting for the virtual volume); locking access to the page; converting the read data to embody a second configuration setting for the virtual volume; writing data embodying the second configuration setting for the virtual volume back to replace the read data; and unlocking access to the page.

Figure 6:
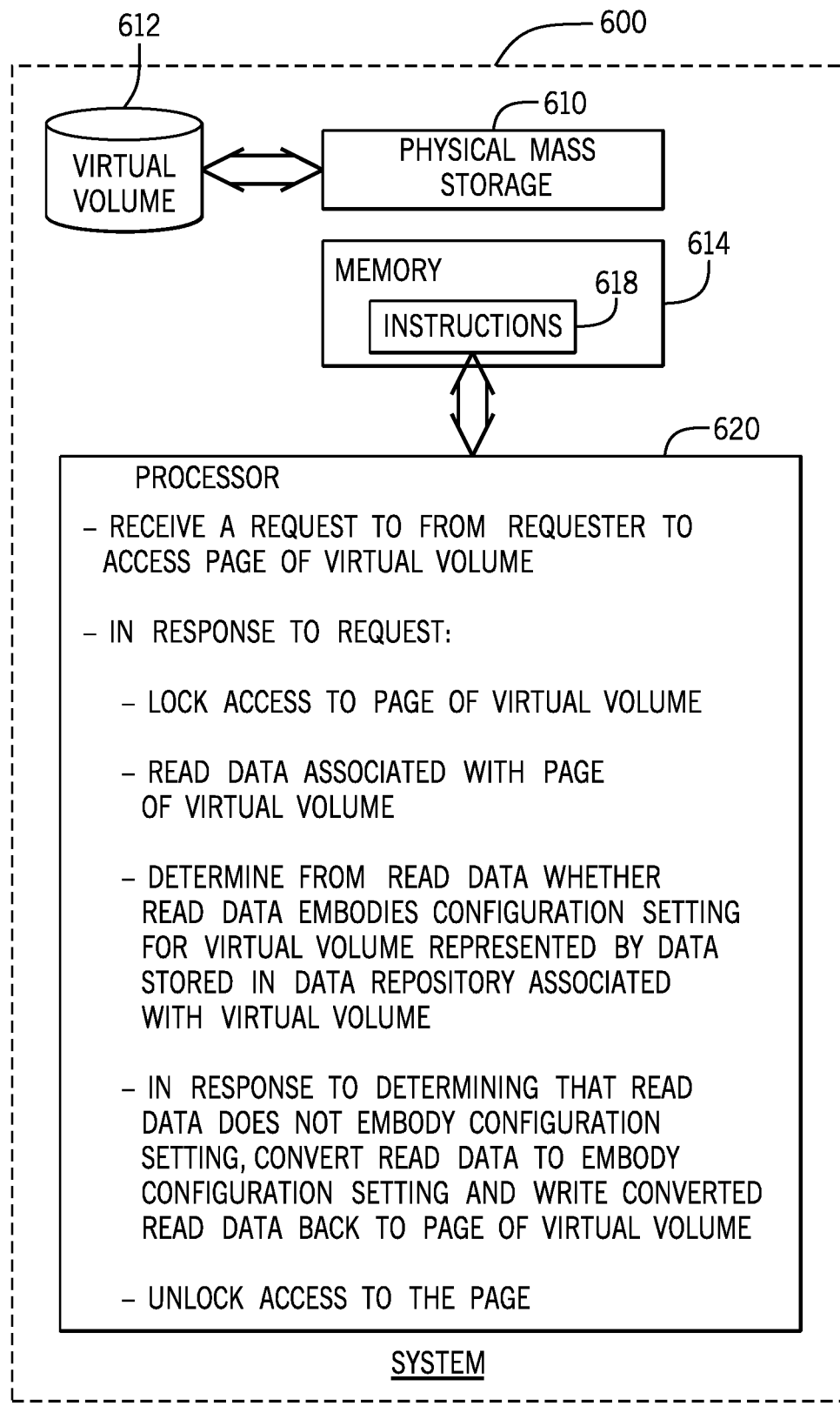
FIG. 6 is a schematic diagram of a system to convert a virtual volume in place according to an example implementation.

Referring to FIG. 6, in accordance with example implementations, a system 600 includes physical mass storage 610 to store data, which corresponds to a virtual volume; a processor 620; and a memory 614. The memory 614 stores instructions 618 that, when executed by the processor 620, cause the processor 620 to receive a request form a requestor to access a page of a virtual volume. The instructions 618, when executed by the processor 620, cause the processor 620 to lock access to the page of the virtual volume; read data associated with the page of the virtual volume; determine from the read data whether the read data embodies a configuration setting for the virtual volume represented by data stored in a data repository associated with the virtual volume; in response to determining that the read data does not embody the configuration setting, convert the read data to embody the configuration setting and write the converted read data back to the page of the virtual volume; and unlock access to the page.

Figure 7:
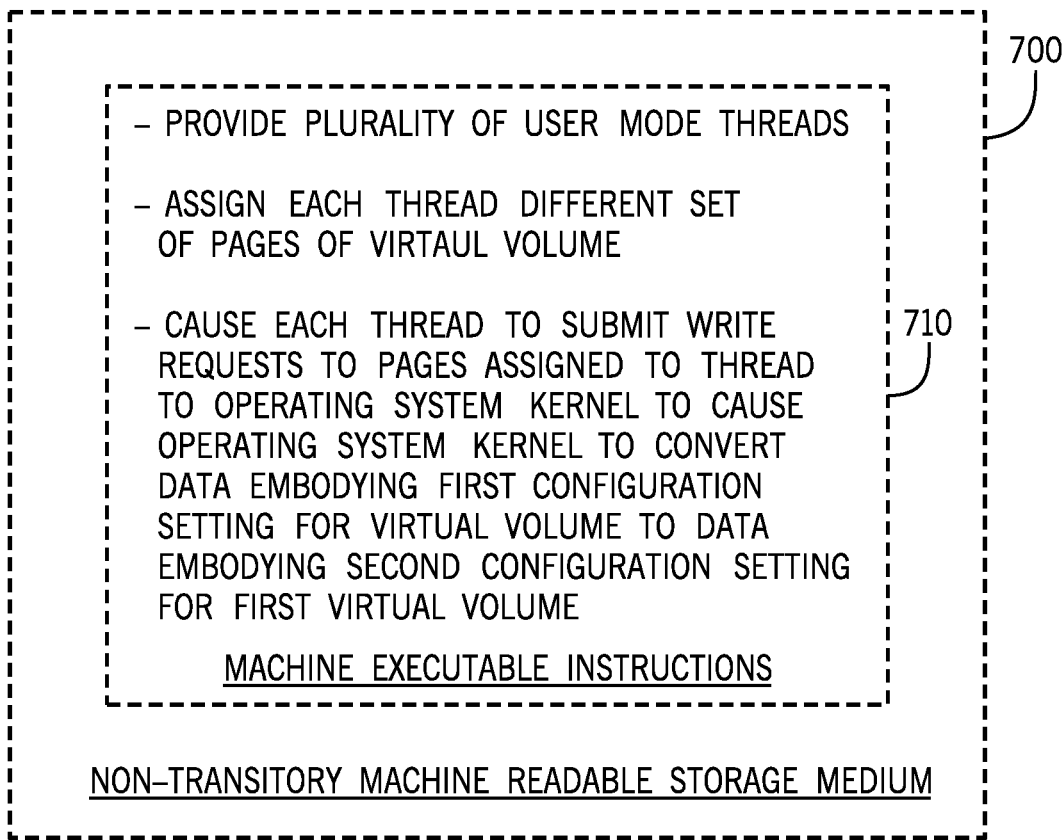
FIG. 7 is an illustration of machine readable instructions to convert a virtual volume in situ according to an example implementation.

Referring to FIG. 7, in accordance with example implementations, a non-transitory machine-readable storage medium 700 (e.g., memory 130 of FIG. 1) stores machine executable instructions 710 (e.g., instructions 135 of FIG. 1) that, when executed by a machine (e.g., physical machine 120 of FIG. 1), cause the machine to provide a plurality of user mode threads (e.g., threads provided by the virtual virtual conversion utility 140 of FIG. 1); assign each thread of the plurality of user mode threads a different set of pages of the plurality of pages of the virtual volume; and cause each thread to submit write requests to pages assigned to the thread to an operating system kernel (operating system kernel 134 of FIG. 1, for example) to cause the operating system kernel to convert data embodying a first configuration setting for the virtual volume to data embodying a second configuration setting for the first virtual volume.

Other implementations are contemplated, which are within the scope of the appended claims. For example, in accordance with further implementations, the in situ virtual volume conversion may be performed without a kernel component. In other words, in accordance with some implementations, the in situ virtual volume conversion may be performed entirely by one or multiple user mode components.

While the present disclosure has been described with respect to a limited number of implementations, those skilled in the art, having the benefit of this disclosure, will appreciate numerous modifications and variations therefrom. It is intended that the appended claims cover all such modifications and variations. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method comprising:
changing a configuration setting of a virtual volume of data stored in a storage system; and
converting data of the virtual volume in place to reflect the changing of the configuration setting, comprising:
an operating system kernel receiving an access request directed to a page of the virtual volume, and in response to the access request, the operating system kernel:
reading data associated with the page of the virtual volume, wherein the read data embodies a first configuration setting for the virtual volume;
locking access to the page;
converting the read data to embody a second configuration setting for the virtual volume;
writing data embodying the second configuration setting for the virtual volume back to replace the read data; and
unlocking access to the page.

2. The method of claim 1, further comprising:
the operating system kernel determining whether metadata associated with the page of the virtual volume represents the page being associated with the second configuration setting; and
the operating system kernel performing the converting in response to the metadata representing the page being not being associated with the second configuration setting.

3. The method of claim 2, wherein the writing comprises the operating system kernel updating the metadata to represent the page being associated with the second configuration setting.

4. The method of claim 2, further comprising:
the operating system kernel identifying the second configuration setting from metadata representing attributes of the virtual volume.

5. The method of claim 1, wherein the access request comprises a dataless write request.

6. The method of claim 1, wherein:
the access request comprises a read request provided by a requester; and
the operating system kernel provides the data embodying the second configuration setting to the requester.

7. The method of claim 1, further comprising, during the converting of the data of the virtual volume in place to reflect the changing of the configuration setting:
the operating system kernel receiving an input/output (I/O) request from a requester, the I/O request being directed to a second page of the virtual volume;
the operating system kernel determining whether metadata associated with the second page of the virtual volume represents the second page being associated with the second configuration setting; and
in response to the operating system kernel determining that the metadata associated with the second page of the virtual volume represents the second page not being associated with the second configuration setting, the operating system kernel:
reading data associated with the second page;
locking access to the second page;
converting the data read from the second page to embody the second configuration setting for the virtual volume;
writing data embodying the second configuration setting for the virtual volume back to replace the read data associated with the second page;
providing the data embodying the second configuration setting for the virtual volume to the requester; and
unlocking access to the page.

8. The method of claim 1, further comprising, during the converting of the data of the virtual volume in place to reflect the change:
the operating system kernel receiving an input/output (I/O) request from a requester, the I/O request being directed to a second page of the virtual volume;
the operating system kernel determining whether metadata associated with the second page of the virtual volume represents the second page being associated with the second configuration setting; and
in response to the operating system kernel determining that the metadata associated with the second page of the virtual volume represents the second page being associated with the second configuration setting, the operating system kernel:
reading data associated with the second page; and
providing the read data associated with the second page to the requester.

9. The method of claim 1, wherein:
the reading the data associated with the page of the virtual volume comprises reading data associated with a plurality of locations; and
the writing the data embodying the second configuration setting for the virtual volume back comprising overwriting data stored in at least some of the plurality of locations.

10. The method of claim 1, wherein the reading, locking, converting, writing, and unlocking are performed by the operating system kernel in response to a user mode read or write request.

11. The method of claim 1, wherein converting the data of the virtual volume comprises:
assigning a plurality of page offsets of the virtual volume to a thread of a user mode utility; and
the thread providing write requests directed to the assigned plurality of page offsets to an operating system kernel.

12. The method of claim 1, wherein the virtual volume comprises a thin provisioned volume, and converting the data comprises:
determining whether areas of the thin provisioned volume have been written or not; and
controlling the conversion based on a result of the determination.

13. A system comprising:
a processor; and
a non-transitory machine readable storage medium to store instructions that, when executed by the processor, cause the processor to:
receive, with an operating system kernel, a request from a requester to access a page of a virtual volume; and
in response to the request, with the operating system kernel:
lock access to the page of the virtual volume;
read data associated with the page of the virtual volume;
determine from the read data whether the read data embodies a configuration setting for the virtual volume represented by data stored in a data repository associated with the virtual volume;
in response to determining that the read data does not embody the configuration setting, convert the read data to embody the configuration setting and write the converted read data back to the page of the virtual volume; and
unlock access to the page.

14. The system of claim 13, wherein the request comprises a read request, and the instructions, when executed by the processor, further cause the processor to:
in response to determining that the read data does not embody the configuration setting, provide the converted read data to the requester.

15. The system of claim 13, wherein the request comprises a read request, and the instructions, when executed by the processor, further cause the processor to:
in response to determining that the read data does embody the configuration setting, provide the read data associated with the page to the requester.

16. The system of claim 13, wherein the instructions comprise instructions to:
assign each of a plurality of user mode threads a different set of pages of a plurality of pages of the virtual volume; and
for each thread of the plurality of user mode threads, cause the thread to submit, to the operating system kernel, write requests for the set of the pages assigned to the thread to cause the operating system kernel to convert data embodying the first configuration setting for the virtual volume to data embodying the second configuration setting for the virtual volume.

17. A non-transitory machine readable storage medium storing instructions that, when executed by a machine, cause the machine to:
provide a plurality of user mode threads;
assign each thread of the plurality of user mode threads a different set of pages of a plurality of pages of a virtual volume; and
cause each thread of the plurality of user mode threads to submit write requests to the set of the pages assigned to the thread to an operating system kernel to cause the operating system kernel to convert data embodying a first configuration setting for the virtual volume to data embodying a second configuration setting for the virtual volume.

18. The non-transitory machine readable storage medium of claim 17, wherein:
a given write request of the write requests causes the operating system kernel to overwrite data stored in storage locations associated with the virtual volume.

19. The non-transitory machine readable storage medium of claim 17, wherein the instructions, when executed by the machine, further cause the machine to write data to a data repository to change metadata associated with the virtual volume to change the first configuration setting to the second configuration setting.

20. The non-transitory machine readable storage medium of claim 17, wherein the virtual volume comprises a thin provisioned volume, and the instructions, when executed by the machine, further cause the machine to:
cause a given thread of the plurality of user mode threads to determine whether areas of the thin provisioned volume have been written or not; and
control submission of the write requests to pages assigned to the thread based on a result of the determination.

21. The method of claim 1, wherein converting the read data to embody the second configuration setting comprises converting data other than metadata to embody the second configuration setting.

22. The method of claim 1, wherein converting the read data to embody the second configuration setting comprises at least one of compressing the read data, decompressing the read data, or deduplicating the read data.

* * * * *